United States Patent [19]
Harris

[11] Patent Number: 5,339,174
[45] Date of Patent: Aug. 16, 1994

[54] FACSIMILE MACHINE TIME SHIFTING AND CONVERTING APPARATUS

[76] Inventor: Scott C. Harris, 7988 Foxmoor Dr., Dunn Loring, Va. 22027

[21] Appl. No.: 346,211

[22] Filed: May 2, 1989

[51] Int. Cl.⁵ .............................................. H04N 1/32
[52] U.S. Cl. .................... 358/442; 358/400; 358/434; 358/435; 358/468; 379/100
[58] Field of Search .............. 358/400, 402, 407, 442, 358/468, 434, 435, 436; 379/100, 53

[56] References Cited

U.S. PATENT DOCUMENTS

| | | | |
|---|---|---|---|
| 4,491,873 | 1/1985 | Takayama | 379/100 |
| 4,646,160 | 2/1987 | Iizuka et al. | 358/402 |
| 4,746,986 | 5/1988 | Tanigawa | 379/100 |
| 4,811,385 | 3/1989 | Watanabe | 379/100 |
| 4,814,890 | 3/1989 | Kato | 379/100 |
| 4,907,255 | 3/1990 | Kurokawa | 358/436 |
| 4,935,955 | 6/1990 | Neudorfer | 379/100 |
| 4,964,154 | 10/1990 | Shimotono | 379/100 |
| 4,989,233 | 1/1991 | Iggulden et al. | 379/100 |

OTHER PUBLICATIONS

Hawkins, William J. "For-your-home Video Phones", Popular Science, vol. 232, #3, Mar. 1988.

*Primary Examiner*—Edward L. Coles, Sr.
*Assistant Examiner*—Thomas L. Stoll

[57] ABSTRACT

A system for communications and conversion between different formats of facsimile machines. The system receives information from a sending facsimile machine, and determines if conversion needs to be made. If conversion needs to be made, the device sends the proper handshaking signals to the sending facsimile machine. The sending facsimile machine then sends the transmission which is recorded by the present invention on any suitable sound recording media. At some later time the present invention performs the conversion without the constraints of real time processing, and outputs a converted signal to the local facsimile machine which recognizes it as a transmission from another facsimile machine in the format for which it is prepared. Another aspect of the invention determines if secure facsimile transmission is occurring at a time when the decryption key is not present in the local facsimile machine. If so, the machine records the incoming communication to save until such time as the decryption key is present. Yet another aspect of the invention receives communications to be sent from the local facsimile machine, and records these communications and resends them at a later time.

10 Claims, 10 Drawing Sheets

FACSIMILE MACHINE TIME SHIFTING AND CONVERTING APPARATUS

BACKGROUND AND SUMMARY OF THE INVENTION

The present invention relates to a device for storing and converting facsimile communications. More specifically, the present invention makes greater use of a facsimile machine, by storing a facsimile communication which is received.

Facsimile machines are devices for communicating image information between a local machine and a remote machine. Since the original advent of facsimile machines, they have been become progressively more sophisticated and complicated. One of the problems which the sophistication has caused is the incompatibility between different generations of facsimile machines, which operate in different facsimile formats. The first generation of facsimile machines is now known as Group I, and is almost completely outdated. A second generation of facsimile machines, called Group II, transmits analog information at a relatively slow pace (approximately six minutes per page). The current (1989) state of the art is known as Group III, and transmits information relatively quickly at approximately 1 page per minute. The information transmitted is in compressed digital form, using a relatively simple compression code (Huffman code and others), and is transmitted having different grades of resolution. By decreasing the resolution, the speed of sending can be increased.

Each time a new generation of facsimile machines has been introduced, it makes obsolete the previous generation of facsimile machines. Many Group III machines currently on the market can operate in Group II or Group III modes, and thereby allow communication with either Group II or Group III machines. Group II machines, however, were never designed for use with Group III and cannot be used with the incompatible Group III format. The Group II machines can not receive and decode nor encode the compressed digital signals produced in Group III.

Group IV facsimile machines are a practical certainty within the next few years. The introduction of Group IV will make the Group III machines obsolete, (or at least less desirable) and many facsimile users will buy a new machine just to get the faster speeds of Group IV.

Many of the currently available Group III machines are extremely sophisticated machines. Some machines have the ability, for instance, to print on plain paper. Moreover, the electronics and auto-dial functions of many of these machines are quite advanced and reliable. However, many people will sell or salvage these machines in their zeal to receive the state of the art Group IV machine.

Moreover, most of the cost of a facsimile machine, especially a complex one as described above, is the scanner and printer etc., while the actual communications electronics represent a less significant part of the cost.

Until the advent of the present invention, no satisfactory way was available for converting from a lower group (e.g., Group III) to a higher group (e.g., Group IV) in a machine that was not designed for this higher group. The faster transmission speed of the higher group has made it impossible to do a real time conversion between the two groups. I have first realized this problem, and have devised a technique to overcome this problem.

While overcoming this problem, I have also realized that invention enables significant advantages in other types of communications besides facsimile communications, and also provides advantages in facsimile communications other than mere conversion between one group and another. For instance, another problem in facsimile communications is in the field of secure facsimile communications. Secure transmissions involve sending encoded data to a remote facsimile machine. This remote machine cannot receive and print the data without the proper decryption key. The decryption key must always be supervised to maintain its security. Therefore, either an operator must be present with the machine at all times, or the machine is essentially useless during off-hours. If the machine receives the encrypted data without the encryption key therein, it will be received as gibberish. Until the advent of the present invention there has been no satisfactory way of dealing with this problem, and therefore secure facsimile transmission could only be sent during hours when it was known that an operator would be present with the decryption key.

The prior art of facsimile machines has also required that each one facsimile machine be provided for each telephone line, and vice versa. It was impossible to allow one facsimile machine to effectively service two telephone lines, as the facsimile machine would be busy whenever one of the lines was in use. The present invention enables one facsimile machine to service two lines or even more telephone lines.

Moreover, the present invention allows the fastest possible group of facsimile communications to be used, even when the site at which the invention is installed (the local) has only a lower group facsimile machine. This allows savings in the telephone bill, by minimizing the amount of telephone connect time. The present invention also enables time-shift-type sending to minimize the telephone bills by making use of off-peak hours to send the transmission. The time difference to most foreign countries, and notably Japan, is at least a few hours. Therefore, it makes sense to send many communications to these countries during the off-peak hours (typically beginning at 11 p.m. at night). However, this is currently not usually done, because an operator would have to be present to send it. Another aspect of the present invention enables it to be used for just such a purpose.

It is therefore an object of the present invention to provide a facsimile time shifting and converting device which performs all of the above-discussed functions. The device of the present invention enables conversion from any one facsimile group to any other facsimile group now known or later devised. Therefore, any facsimile machine now in use will be compatible with any later facsimile formats via use of the present invention.

Another object of the present invention is to produce a device which time-shifts facsimile information that is received to a later time, to enable it to be properly processed at this later time.

Still another object of the present invention is to time shift facsimile sending until a later time to minimize telephone connect charges.

The present invention overcomes all of these problems in a new and unobvious way. Specifically, the present invention recognizes that all of these problems can be overcome by time shifting the facsimile communications. I have recognized that off-the-shelf audio equipment has a dynamic range which is at least as great as the dynamic range of any standard telephone line. Accordingly, I have recognized that such audio recording technology can be most advantageously used to record any signal from a fax machine. Of course, any other sound recording means or data recording means could be used in place of such audio technology. Once the data is stored on an audio medium, it can be processed as slowly as desired, since the constraints of real-time no longer need to be followed. The conversions of the present invention between groups are therefore done without regard to real time. The tape may be slowed to a half or a quarter its normal speed in order for this conversion to be carried out. Alternately, a circuit may determine certain characteristics from the signal and create an entirely new signal "emulating" the desired group in which to transmit.

The present invention includes means for communicating with a remote facsimile machine, that is sending and receiving the necessary handshaking signals to initiate the remote fax machine to send a message. This message is recorded. It is later played to the local fax machine by emulating a call coming into the local machine and playing back the converted signal.

According to the encryption technique of the present invention, data is detected as being non-standard facsimile format, and is stored on the audio recording means whenever this non-standard format is detected. Alternately, all incoming faxes could be stored to allow playback of any that are later determined after printing to be encoded. Any storage on the storing means initiates an indicator indicating that a reception has been obtained. Upon the user returning with the proper decryption key, the user initiates the storage means to play back the stored information. The stored information is then coupled to the facsimile machine with the decryption key in place, and the facsimile machine recognizes and decrypts the data being played back as though it were the original transmission from the secure facsimile machine. The device of the present invention provides the necessary handshaking signals followed by a playback of the facsimile transmission.

Finally, the device of the present invention enables a time-shifting mode in which the telephone number of the receiving facsimile is entered along with a command to wait until a certain time to transmit it. The present invention then stores the facsimile transmission to be sent, on a sound recording means, along with the proper data. At the proper time, the machine of the present invention begins dialing the proper telephone numbers, creates the handshaking signals necessary to communicate with the remote facsimile machine, and finally the recorded information.

BRIEF DESCRIPTION OF THE DRAWINGS

These and other aspects of the present invention will now be described in detail with reference to the accompanying drawings, wherein.

DESCRIPTION OF THE PREFERRED EXEMPLARY EMBODIMENTS

This specification assumes a working familiarity with facsimile machines, including the specific techniques used by existing facsimile machines to communicate with one another. However, as a brief background, the appropriate handshaking signals between facsimile machines in order to make a substantive communication will be described in a summary form with reference to FIG. 1. This information can be found in CCITT (International Telegraph and Telephone Consultive Committee) recommendation T.30.

Figure 1:
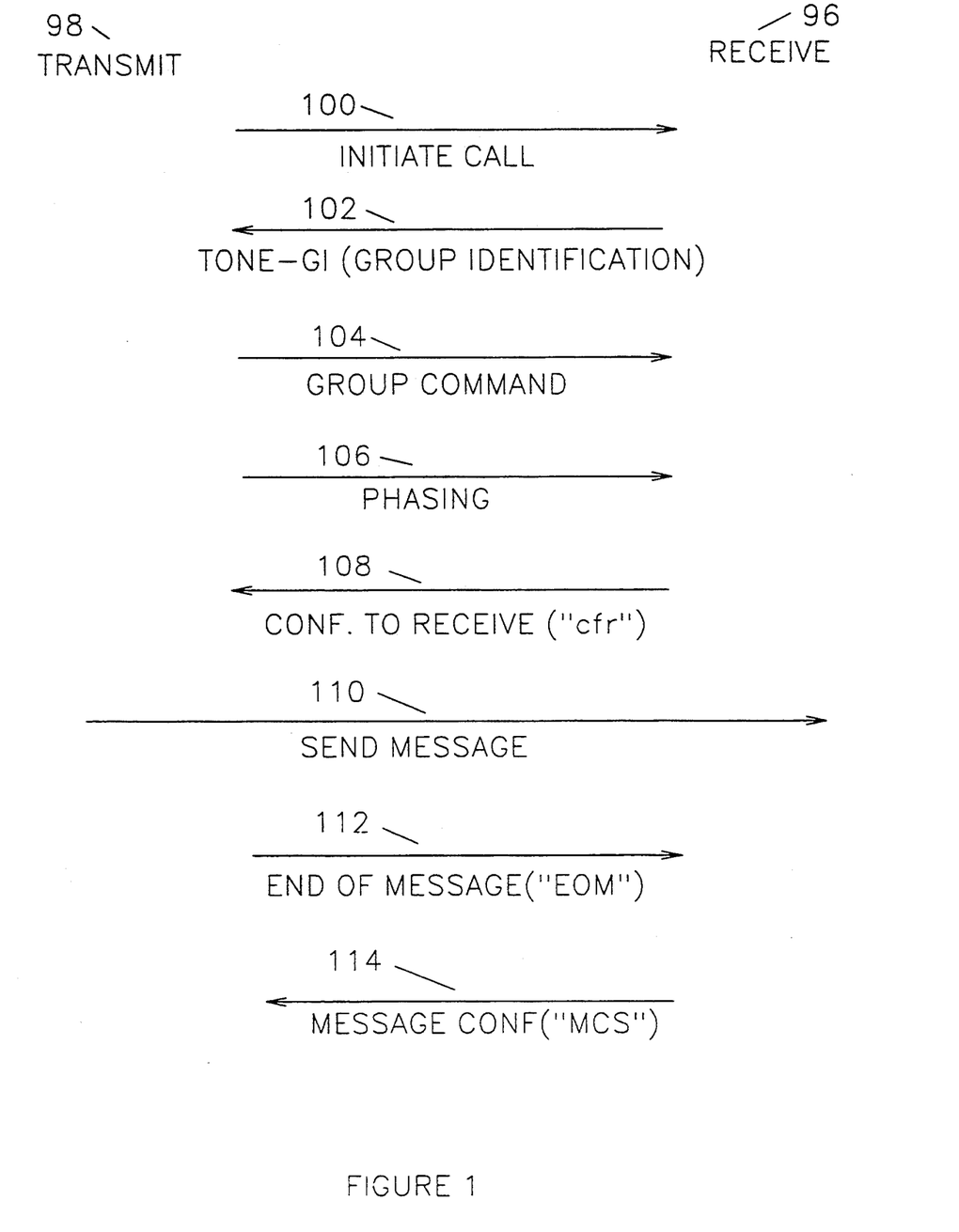
FIG. 1 shows a summary diagram of facsimile communication including the substantive communication and the handshaking signals.

Step 100 designates the transmitting facsimile machine or fax 98 initiating the call to the receiving facsimile 96. This causes an electronic path to be made through the telephone network, and the receive facsimile 96 eventually receives a ring tone from the telephone network. The receive facsimile responds in step 102 with a receive tone, which includes a group identification signal (GI). The group identification signal has a spectral content which depends on the capabilities of the receive facsimile machine. For instance, this tone or group of tones will indicate whether the receive facsimile 96 can accommodate Group II, III, IV or combinations of the above. The GI signal is sent to transmit facsimile 98 until such time as it is acknowledged. At step 104, the transmit facsimile 98 sends a group command signal to the receive facsimile 96. The group command signal uses different frequencies than the group identification signal, and selects one of the available groups indicated by the group identification signal. The group command signal is then followed by phasing information at step 106.

The receiver responds at step 108 with a confirmation to receive (CFR) signal. This confirmation to receive signal indicates that the phasing and command information is received properly, and comprises a burst of information indicative of the group to be received. Assuming that this all done properly, the transmitter will immediately begin to send the substantive communication at step 110.

At the end of the message, the transmitter sends an end of message (EOM) signal at step 112. The receive facsimile 96 responds to the end of message signal 112 with a message confirmation signal (MCS) at step 114. This MCS signal 114 is identical to the CFR signal at step 108 indicating the substantive communication has been received.

All of the above signals except for the substantive communication (that is, signals 100, 102, 104, 106, 108, 112, and 114) will be described throughout this specification and claims as handshaking signals.

Many different aspects of this sequence are possible, and some modifications in this sequence may be expected. However, this is the basic system used by today's facsimile machines, and the system with respect to which the present invention will be described.

Figure 2:
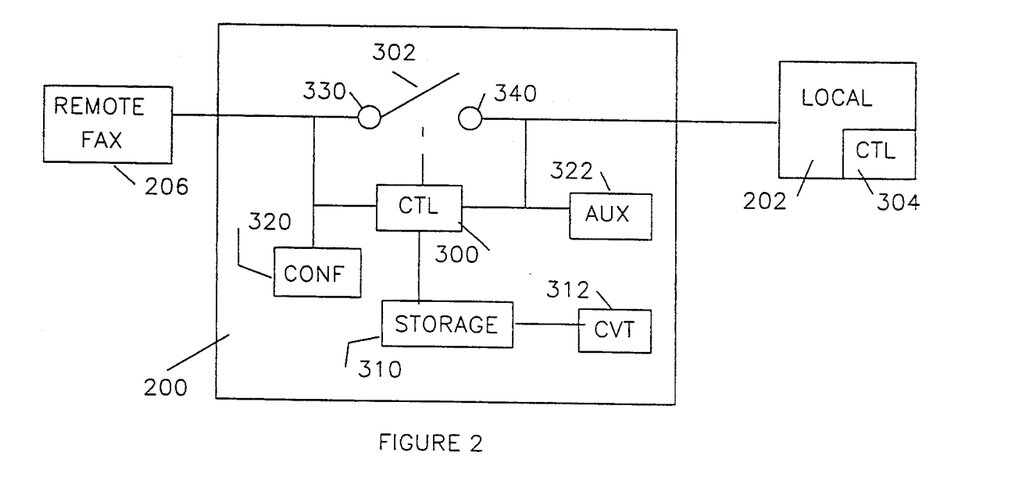
FIG. 2 shows a first embodiment of the invention.

FIG. 2 shows a first embodiment of the first embodiment of the facsimile interface 200 of the present invention in basic block diagram form. The telephone trunk 204 is shown coming from remote fax 206 and connected to facsimile interface 200 where it is input in parallel to a first contact 330 of a normally open switch 302 and to controller 300. The other end of switch 302 is connected to local fax 202, where it is input to the internal controller 304 of local fax 202. No special operations need be taken in the controller 304 of local fax 202. However, this is shown because communications will be carried out with this local controller 304 to emulate normal operation.

The FIG. 2 embodiment operates by using the controller 300 of the facsimile interface 200 in place of the controller 304 of local fax 202 to communicate with remote fax 204. Controller 300 provides the necessary handshaking responses, and also provides signals to local fax 202 to allow local fax 202 to operate properly in certain modes.

Associated with controller 300 is a storage circuit 310, and a converting circuit 312. I have recognized that off-the-shelf audio equipment has a dynamic range which is at least as great as the dynamic range of any standard telephone line. Accordingly, I have recognized that such audio recording technology can be most advantageously used to record any signal from a fax machine, and therefore the storage circuit 310 is preferably an audio recorder. Of course, any other sound recording means or data recording means could be used in place of such audio technology. Once the data is stored on an audio medium, it can be processed as slowly as desired, since the constraints of real-time no longer need to be followed.

Additional structure associated with the facsimile interface 200 is also shown as auxiliary circuitry 320 and will be in discussed in detail with reference to further FIGURES.

The first embodiment of the invention operates by having the controller 300 perform the functions that are usually performed by controller 304 of local fax 202. The operation of this embodiment will now be described with reference to the flow chart of FIG. 3.

Figure 3:
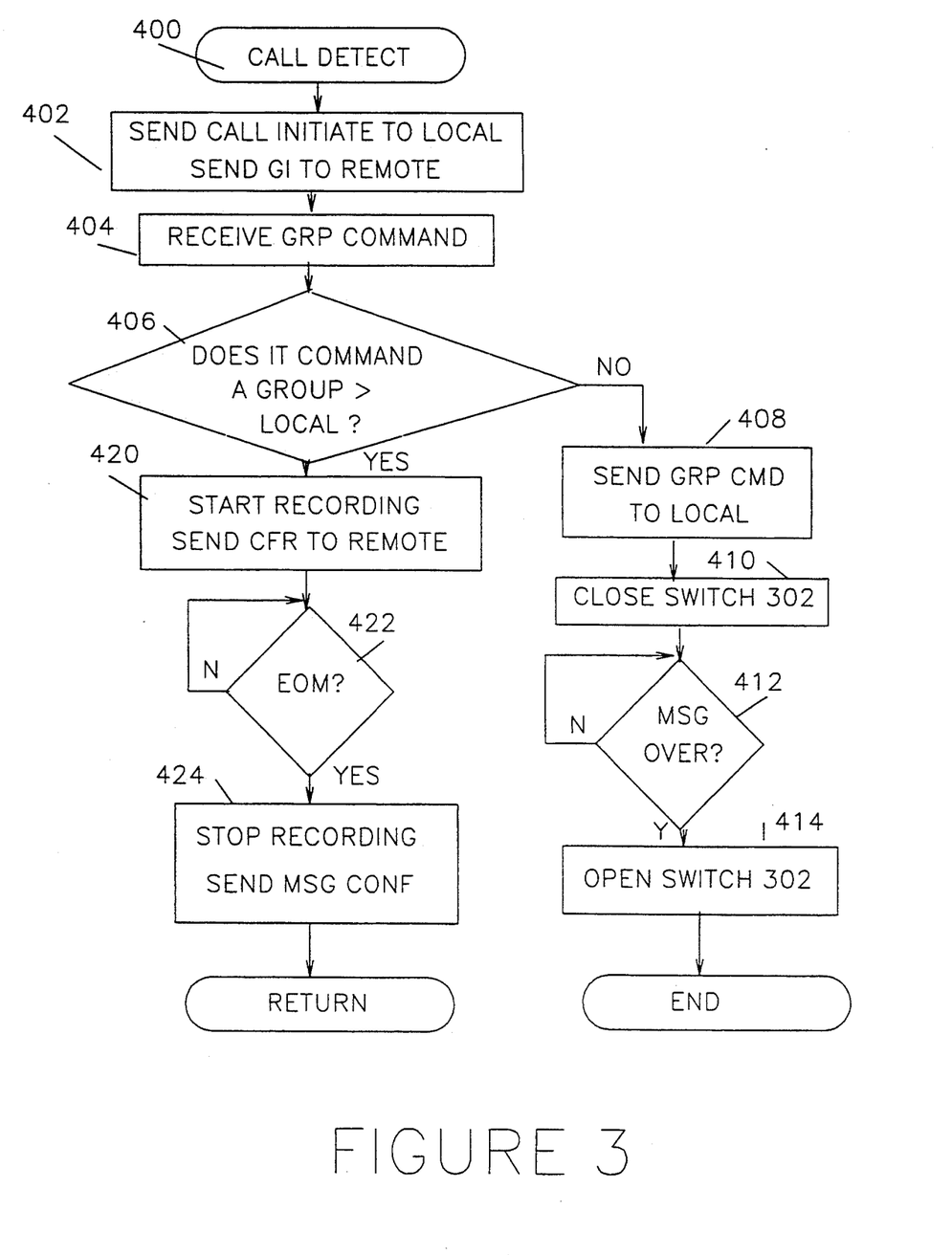
FIG. 3 shows a flowchart of operation of this first embodiment.

A call is detected at step 400, by controller 300. (Note that switch 302 is open at this time). This call detect corresponds to step 100 in FIG. 1. Since switch 302 is open, this call is not detected by controller 304 of local 202. Upon detecting this call, controller 300 sends two signals at step 402. Controller 300 sends a call initiate to the local 202, which the local 202 recognizes as an incoming call. In this way controller 300 emulates a call coming in to local 202 whenever it receives an incoming call. Local 202 sends its group identification (GI) signal which is sent to the open switch, which is therefore not further conducted. Controller 300 also sends its own group identification signal to the remote on telephone trunk 204.

Local fax 202 receives the call initiate, and responds with its own group identification signal. However, this group identification signal will indicate less groups than can be handled by the present invention. The controller 300 sends a group identification signal which includes all of the available groups.

The embodiment of this invention will be described as though local 202 is a Group II/III facsimile machine, and facsimile interface 200 is configured to accept Groups II/III/IV. Therefore, the group identification signal sent by local 202 to facsimile interface 200 will be a group identification signal for Group III being the highest group. However, facsimile interface will ignore this group identification signal, and will send a group identification signal indicating Group IV as the highest group to remote facsimile 206.

The remote facsimile 206 responds by sending a group command (step 104) which is received by facsimile interface 200 at step 404. At step 406, a decision is made as to whether the group that is commanded is a higher group than the group which local fax 202 can handle. In the example used in this preferred embodiment, the decision determines whether Group IV has been commanded. If the result of the decision at step 406 is negative, and the group is not greater than the local can handle, the facsimile interface 200 is not necessary as a converter for this particular communication. Therefore, it sends a group command to the local 202 at step 408, this group command corresponding to the group command received from the remote (step 104). Switch 302 is then closed at step 410 enabling the communications from the remote facsimile to be passed through directly to the local facsimile 202. According to this the incoming communication is of a group which is compatible with the existing local facsimile 202, and therefore the communication is passed directly through to local facsimile machine 202, and communications carries on with the existing facsimile 202 without the facsimile interface 200, from this point on. Facsimile interface 200 does detect when the message is over at step 412, and opens the switch 302 at step 414 so that the next communication can begin as above.

If the result at step 406 is positive, and the group commanded is greater than the group which can be handled by local 202, control passes to step 420.

Step 420 starts recording the information on storage unit 310 and sends the CFR signal to the remote fax 206. When remote fax 206 receives the CFR signal, it sends the message (step 110) which is then recorded on storage medium 310. Step 422 continually monitors for the end of message (EOM) signal. When the end of message signal is received, the recording is stopped and the message confirmation signal is sent to the remote at step 424. This ends the message receive phase.

Figure 4:
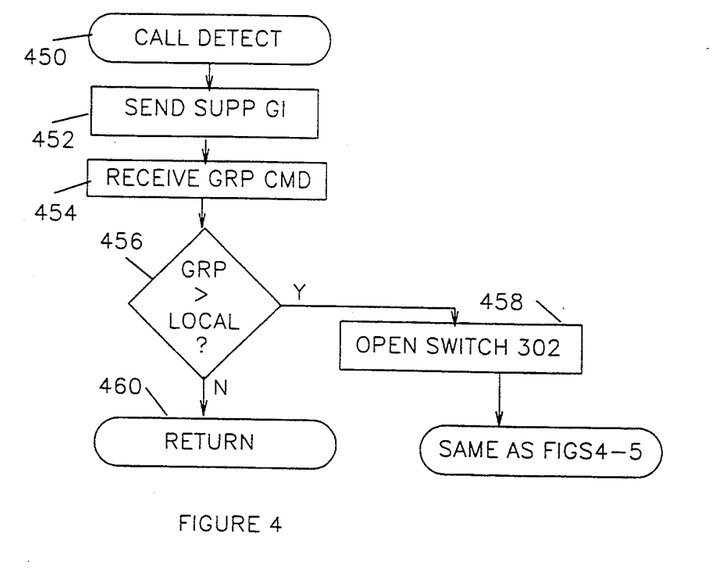
FIG. 4 shows a flowchart of operation of an alternate embodiment.

A modification of FIG. 2 is possible in which the switch 302 is normally closed. In this case, the flow chart of FIG. 4 is used in place of the FIG. 3 flow chart. The call is detected at step 450 the same as in FIG. 3. However, the call initiate to the local is never sent, because the local simultaneously receives the call. A supplemental GI signal is sent at step 452, which mixes with the GI signal sent by the local. This supplemental GI signal, in this embodiment, is the signal for Group IV, which is sent along with the signal from Group III that is sent from the local. The group command is received at step 454, and step 456 determines if this group command commands a group greater than the capacity of the local similar to step 406. If the command is greater than the local, switch 302 is opened at step 458 followed by an execution of the same steps as executed in FIG. 4 in step 420 to the end. If the group is not greater than local capacity, a return is executed at step 460, allowing the local fax machine 202 to communicate normally.

Figure 5:
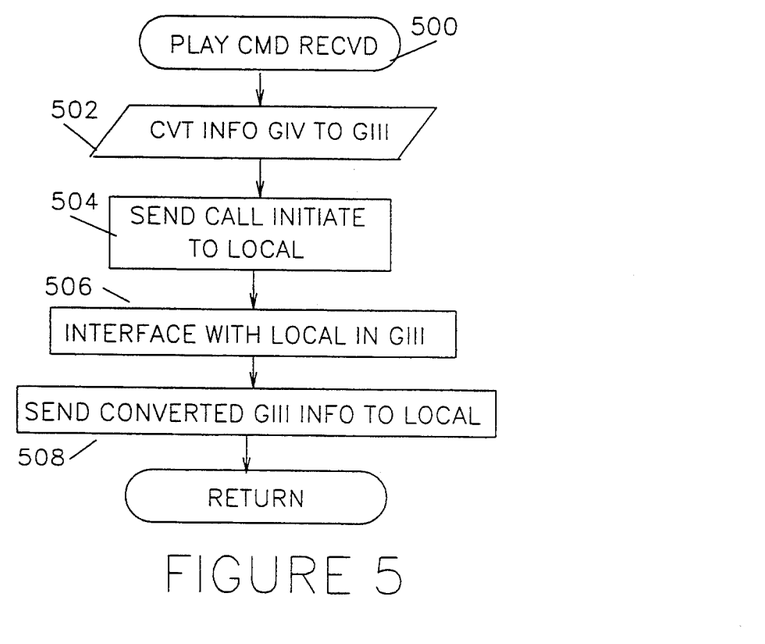
FIG. 5 shows a flowchart of operation of the playback sequence.

FIGS. 3 AND 4 illustrate the first and second embodiments, respectively, of the receive sequence. FIG. 5 illustrates a flow chart used in the playback sequence of this embodiment.

FIG. 5 starts at step 500 when a playback command is received. Control then passes to step 502 where the information is converted from Group IV to Group III. This will be discussed in more detail with reference to FIGS. 6 and 7. After or during the conversion process, a call initiate signal is sent to the local fax 202. This call initiate signal is the same as the signal sent in step 402 of FIG. 3. This is followed at step 506 by sending the necessary handshaking signals to interface with the local in Group III. Finally, step 508 converts the stored Group IV information to Group III, and sends the converted Group III information to the local fax 202. It is again emphasized that although the example given involves communication between Group IV and Group III machines, this is by no means limitive.

Figure 6:
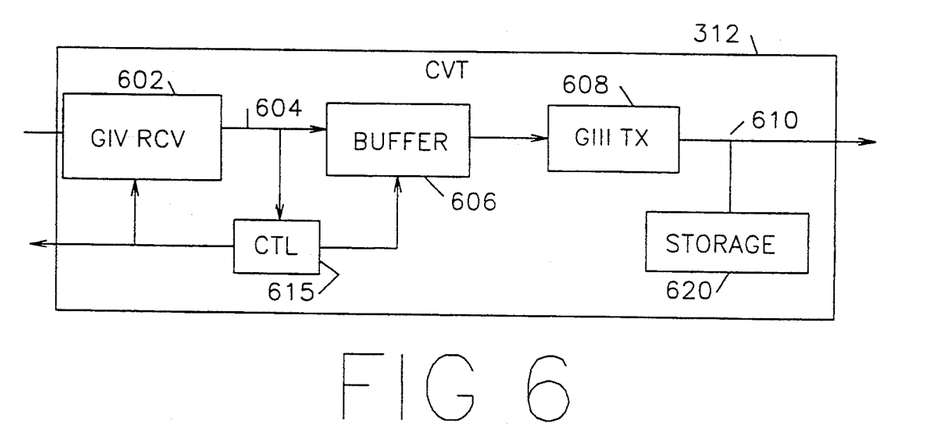
FIG. 6 shows a representative conversion apparatus.

FIG. 6 shows a representative circuit for converting between Group IV and Group III. The representative technique of FIG. 6 is merely exemplary, it being understood that there may be simpler ways to convert between Group IV and Group III than those shown by FIG. 6. However, this provides one way in which those of ordinary skill in the art could make this conversion, it being understood that many other ways are possible.

Convert module 312 (from interface 200) is shown in FIG. 6 as having signals input to a Group IV receive module 602. This Group IV receive module would be a similar module to that which is normally used by Group IV facsimile machines, which receives the facsimile coded information, and produces an output signal which would normally be sent to the facsimile printing apparatus. This output signal 604 is then appropriately buffered by buffer 606, and sent to a Group III transmitting module 608. This Group III transmitting module would be the module that is normally used by a Group III fax machine, to convert the electrical signals produced by the scanner into signals to be sent on the telephone trunk line. These signals, shown as signals 610, are then output from the convert module 312 of FIG. 6.

The system is shown as being controlled by a controller 615 which may be controller 300, a separate microprocessor, or may be dedicated logic. The controller 615 operates according to the flow chart of FIG. 7.

Figure 7:
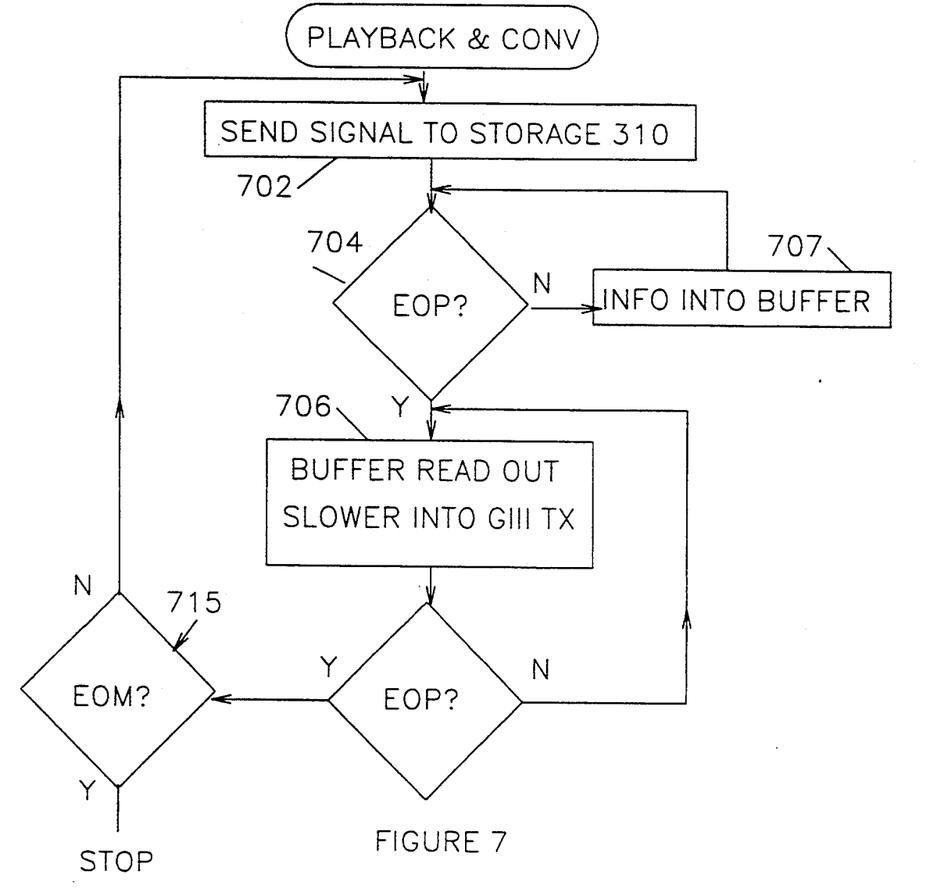
FIG. 7 shows a flowchart of operation of this conversion apparatus.

FIG. 7 shows the convert operation and therefore elaborates step 502 of FIG. 5. The controller 610 starts the convert mode by sending a send signal to storage medium 310, enabling the Group III transmitter 608 to send. Controller 610 also monitors the output of Group IV receiver 604 for an end of page marker at step 704. The information from Group IV receiver 602 is coupled into buffer 706 at step 704, which in this embodiment can be a FIFO shift register, a bucket-brigade type register or an audio tape, having a capability of storing the entire information for one page. The information is continually input into buffer 606 until the end of page marker is detected at step 704. At this time, the contents of buffer 606 are is read out into the Group III transmitter 608, at a slower speed, at step 706. The Group III transmitter appropriately formats the buffered information, and sends it on line 610. When the end of page signal is received, control then passes to step 702 which again sends the send signal to the storage unit 310 to begin reading another page. The end of message signal detected at step 715 will terminate this routine at the proper place.

According to this embodiment, the Group IV signals are received, converted to print-quality signals, buffered, converted to Group III transmit signals, and then transmitted. Some of the appropriate characteristics of Group IV signals can be found in "Measurement of Data Compression in Advanced Group 4 Facsimile Systems" by Bodson et al,; Proceedings of the IEEE, vol 73, no 4 Apr. 1985. However, many modifications are possible. The Group III signals produced as signals 610 may be themselves stored in a second storage device 620. Alternately the Group III transmitter may be continually transmitting, and the Group IV receiver and recording medium may be enabled to begin their operation before the end of page so that the Group III transmitter is never empty. For instance, the controller 615 may detect when the buffer 606 is 80 percent empty, and may send the send signal at that time. The playback from storage unit 310 may be at slower than normal speed so that the conversion can be accomplished without interrupting the playback. Other modifications are also possible. However, the simplified system of FIGS. 6–7 may be used without concern for speed differences. This is because the Group III system is so much slower than the Group IV system that the time delay to read in the Group IV and begin conversion will be an acceptable time delay from Group III point of view.

Figure 8:
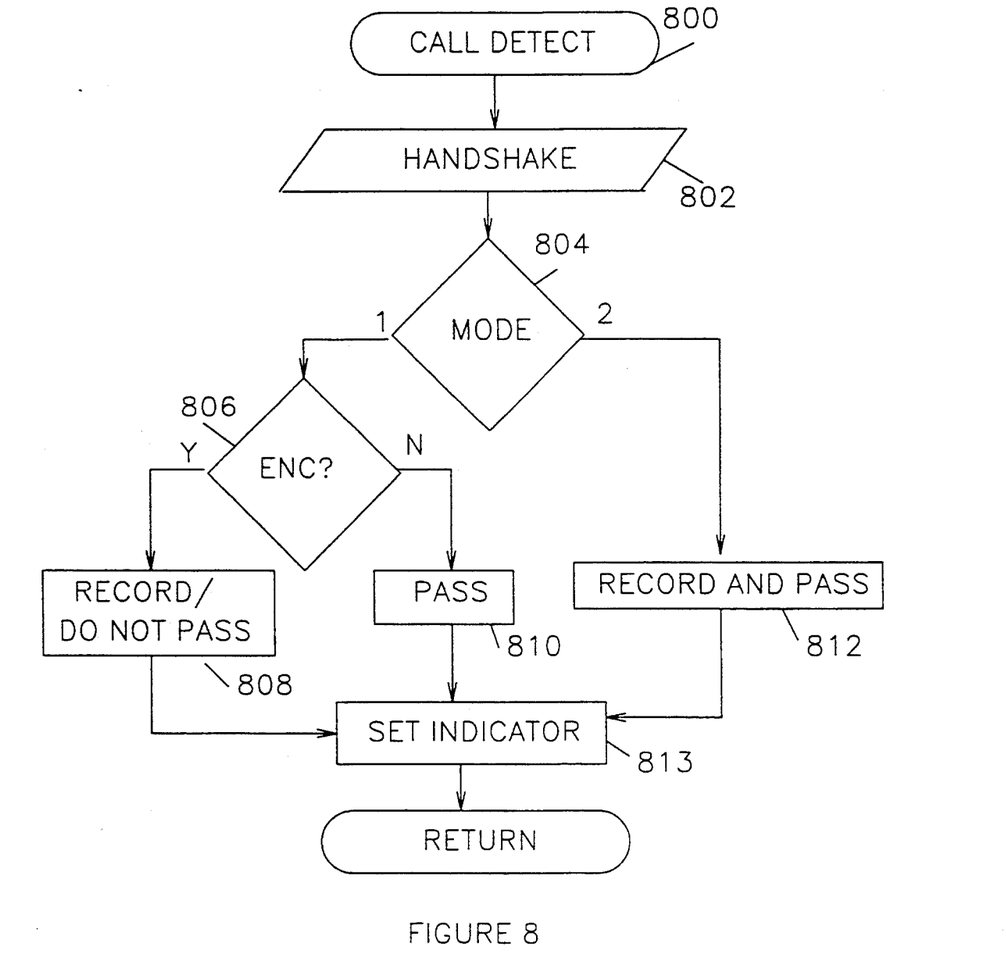
FIG. 8 shows a flowchart of operation of the encryption embodiment of the invention.

Another modification of the present invention enables the invention to be used in a time-shifting mode to decrypt encoded facsimile communications. The facsimile interface 200 of FIG. 2 is used in this mode, but used according to a slightly different flow chart. The specific flow chart is shown in FIG. 8, and will be explained herein. The first embodiment of this invention is intended for converting between one format (group) of facsimile communications and another. This second embodiment is not intended to convert information, per se, at all. Rather, this embodiment either determines when the information cannot be used in its present form and stores this unusable information, or always stores incoming information. This information is intended to be stored when the facsimile machine is being operated unattended such as during hours other than normal working hours. Accordingly, most of the operation of FIG. 8 is similar to the operation of FIG. 3. Moreover, the FIG. 8 flow chart can be used in conjunction with FIG. 3, so that encoded information may be received in Group IV format and converted to Group III before the playback.

FIG. 8 shows a call being detected at step 800, followed by handshaking signals being exchanged at step 802. These handshaking signals may be similar to those exchanged throughout FIG. 3. A mode determination is made in step 804. This mode determination indicates which of the different decryption modes of the facsimile interface is selected. Mode 1 requires the device to make a determination of whether the incoming communication is encrypted or not. This determination is made at step 806, and may be done in any conventional way. If the information is encrypted, the information is recorded at step 808, and no information or handshaking signals are passed to the facsimile machine. The ways in which this can be accomplished is described for instance in steps 420–424 of FIG. 3. If the information is detected as not having been encoded at step 806, control passes to step 810 wherein the information is passed to the local facsimile machine 202, such as shown in steps 408-414 of FIG. 3.

Mode 2 does not require any determination of whether the information is encoded or not. Mode 2 only uses step 812, in which the information is recorded and passed to the facsimile machine at the same time. Therefore, the local facsimile machine 202 will print all incoming communications in real time. However, it can be later determined that any of these communications are encoded. The encoded communications could later be retrieved from the storage medium, and played back with the decryption key in place.

All of these steps of recording are followed by the indicator set step 812, which indicates that a message has been recorded. This prompts the user to play back the recorded message if necessary.

The playback operation of this system is similar to that shown in FIG. 500 except without step 502. Those of ordinary skill in the art would certainly understand that FIG. 8 could also be incorporated within the flow charts of FIG. 3 and/or 4 so that a combination mode having conversion/decryption could be accomplished.

Figure 9:
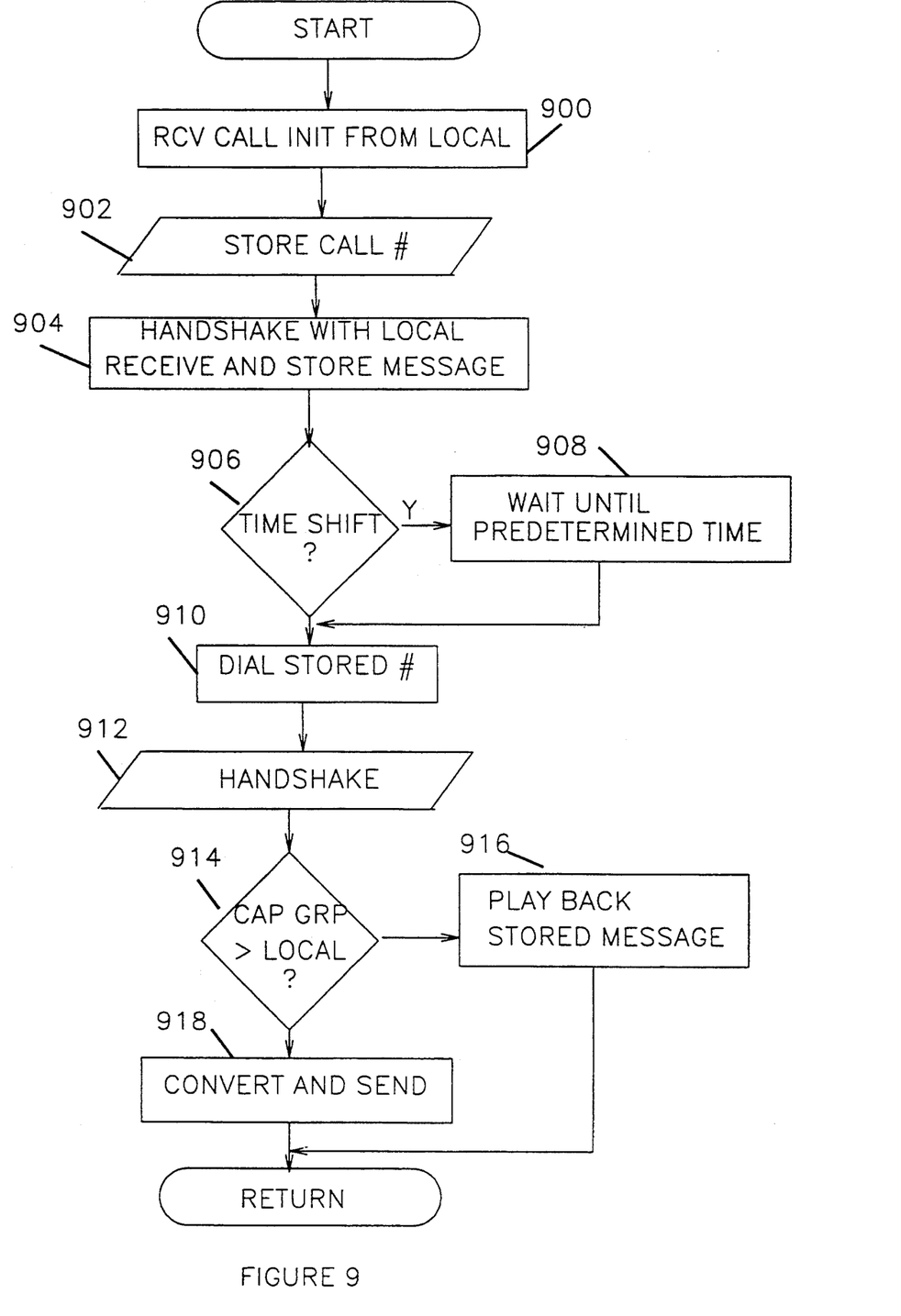
FIG. 9 shows a flowchart of operation of the time-shift embodiment of the invention.

All modes until this point have described what happens to incoming facsimile transmissions (incoming to the local 202). FIG. 9 is used with the apparatus of FIG. 2, and appropriately processes and converts transmissions from the local 202 to be compatible with a higher group remote 206. The flow chart of FIG. 9 also shows the time-shifting operation of the present invention.

FIG. 9 starts with a call initiate being received at step 900 from local 202. This call initiate is to a predetermined facsimile telephone exchange. The number being called is stored at step 902. Step 904 shows the facsimile interface 200 appropriately handshaking with the local 202 to cause local 202 to send its facsimile message. The facsimile message is received and stored on storage medium 310.

A test is made at step 906 to determine whether the device is in time-shift mode. The control of time-shift mode will be described later with reference to the make-up of configuration circuit 320. If the device is determined to be in time-shift mode at step 906, step 908 causes the device to wait until the predetermined time to send.

The send operation begins at step 910, where the stored number, stored in step 902 is dialed up. Appropriate handshaking signals are then sent to the remote facsimile 206 at step 912. Among these handshaking signals, it is determined whether the remote facsimile 206 has a group capacity greater than the group capacity of the local 202. If not, the information stored on the tape is already in proper format, and it can merely be played back at step 916. However, if the group capacity is larger than that of the local 202, it is converted to the higher group at step 918 and sent.

Use of the flow chart of FIG. 9 allows savings in telephone connect charges by ensuring that facsimile communications are sent in their most efficient format, and sent at the least expensive time for sending such communications. The telephone connect charges are minimized by ensuring that all facsimile communications are sent in the highest possible group. The time-shift mode can be set to send these communications for instance during off-peak hours. The sending at off-peak hours has the additional advantage that it keeps the facsimile telephone lines open during the peak hours, so that the device can receive communications during these times rather than taking up the devices time with sending communications. Alternately, the time-shift mode can be set to send the communication at 9 am Tokyo time, for example.

The conversion step included in step 918 can use the device and flow chart of FIGS. 6 and 7, operated in reverse. The time-shifting sequence will be discussed in detail later on.

Previous reasons have been given for buying a new facsimile machine, eg that a user may want the top of the line facsimile machine. Another reason would be if the user made so many facsimile transmissions that the machine and/or telephone lines were frequently busy, so that a second machine was warranted. The use of the present invention can decrease the connect time by operating in Group IV mode, and therefore minimizing the amount of time that the telephone line is in use. However, the final embodiment of this invention relates to a device which can make the maximum use of a single facsimile machine. This device enables one facsimile machine to be used along with two (or more) telephone lines, thereby doubling (or more) the effective messages that the one facsimile machine can receive or send. When used in conjunction with the time-shifting apparatus described above, this interface allows a single facsimile machine to have the capacity only obtained from a number of facsimile machines in the prior art.

Figure 10:
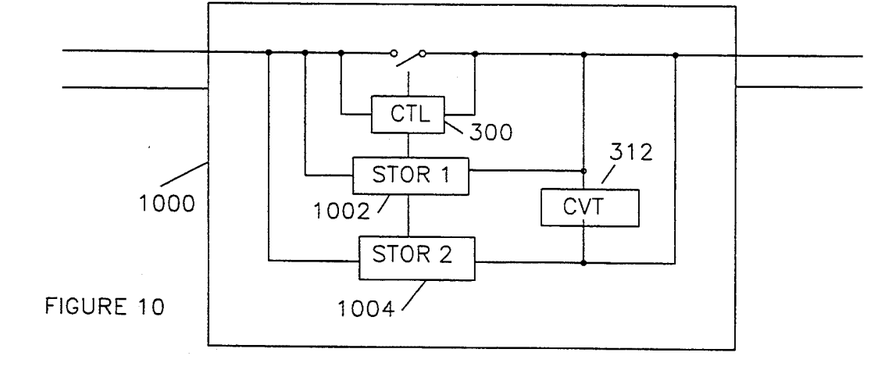
FIG. 10 shows a first embodiment of the two-line operation of the present invention.

FIG. 10 shows a first embodiment of such a device, which is really a modification of the FIG. 2 embodiment. According to the embodiment of FIG. 10, the facsimile interface 1000 includes two storage units in place of the single storage unit 310 of facsimile interface 200; a first storage unit 1002 and a second storage unit 1004. The conversion device 312 is connected to both the first and the second storage units. The controller 300 is substantially the same as the controller used in FIG. 2. This embodiment requires two storage units, capable of operating simultaneously, two receive messages on the appropriate lines. This enables the device to be used to receive an incoming call and store it on one of the storage units, even when the other storage unit is sending its stored contents to its associated local facsimile machine 202 or the other storage unit is also receiving a call. The flowchart of operation is substantially the same as that in FIG. 3, except that a detection of an incoming call should be interrupt driven to enable the recording on the second storage medium. A flag should also be set indicating that the facsimile machine is in use, and the flowchart needs to be configured such that the incoming message will always be stored while the facsimile machine is in use.

This device has a limited usage, but by merely adding a second storage unit 1004, enables the facsimile machine to be used with two lines. By adding a third unit, the fax can be used with three lines, and so on with a limit only being circumscribed by practical reality.

Figure 11:
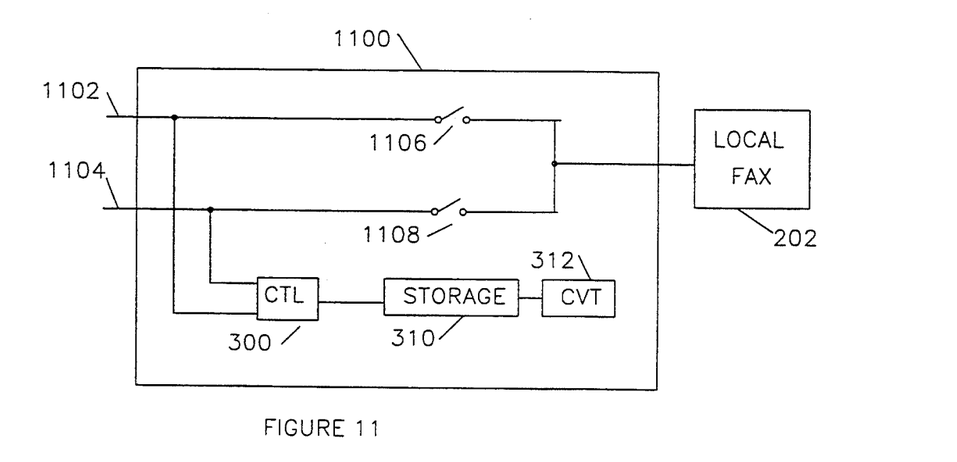
FIG. 11 shows a second embodiment of the two-line operation.

The device of FIG. 11 also allows a single facsimile machine to be used with two telephone lines, using only one storage unit. FIG. 11 shows the single facsimile machine local 202 as being interfaced with two telephone trunk lines through facsimile interface 1100.

Facsimile interface 1100 is shown as receiving two telephone trunk lines, 1102 and 1104. Each trunk line has its associated switch 1106 and 1108. These switches are used in the same way as switch 302 of FIG. 2. Both trunk lines are also connected to controller 300, which has its associated storage 310 and conversion circuit 312. The operation of the system is described with reference to the flowchart of FIG. 12.

Figure 12:
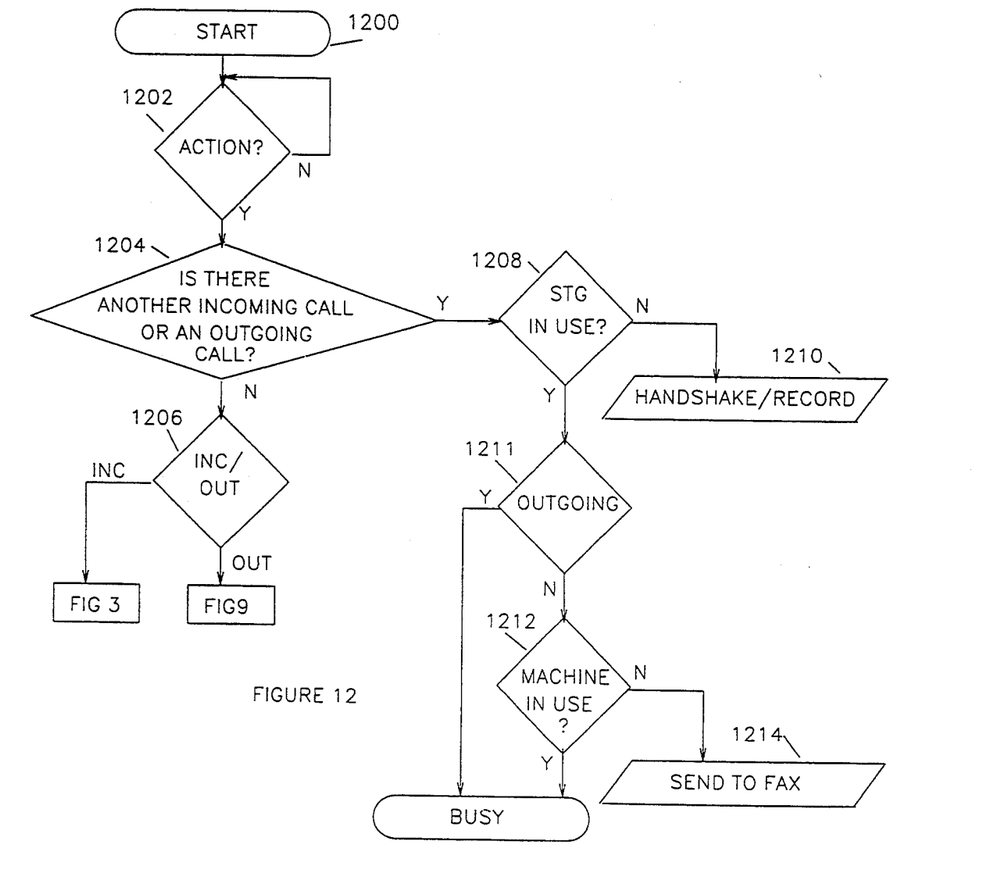
FIG. 12 shows a flowchart of operation of the two-line embodiment of the invention.

FIG. 12 begins at step 1200, and an immediate determination is made at step 1202 as to whether there is any action, which can be an incoming call or an outgoing call. If there is action at step 1202, a determination is made at step 1204 as to whether there is another incoming call or an outgoing call being currently processed by the local fax 202. If there is not, the routine of FIG. 3 is executed for an incoming call, or the routine of FIG. 9 is executed for an outgoing call, based on a decision at step 1240. However, if there is another incoming call or an outgoing call, a determination is made at step 1208 as to whether the storage 310 is in use. If the storage 310 is not in use, the call is simply recorded without any further tests, at step 1210, using the techniques already discussed. If the storage is in use, however, a test is made at step 1212 to determine if the facsimile machine is in use. If the storage 310 is not in use, the incoming call is simply recorded without any tests at step 1210. If the storage is in use, however, a test is made at step 1211 to determine if the request is for outgoing. If so, a busy signal is produced and sent to local fax 202. If the call is incoming ( a negative result at step 1211), a further test is made at step 1212 to determine if the local fax is in use. If the local fax 202 is not in use, the incoming message is sent directly to the local fax 202 without conversion. If both the memory and the facsimile are simultaneously in use, a busy signal is sent at step 1216.

The FIG. 11 embodiment can be modified in the same way as the modification to FIG. 10, thus greatly simplifying the flowchart. If two storage units are used (that is storage unit 310 is actually two separate, simultaneously usable storage units) the routine of FIGS. 3 and 9 can simply be used for incoming and outgoing calls respectively.

The embodiment of the present invention operates in a number of different modes, and accordingly it has been required that a configuration circuit 320 be used to choose between the modes. This configuration circuit 320 will now be described with reference to FIG. 13, along with the modes it controls.

Figure 13:
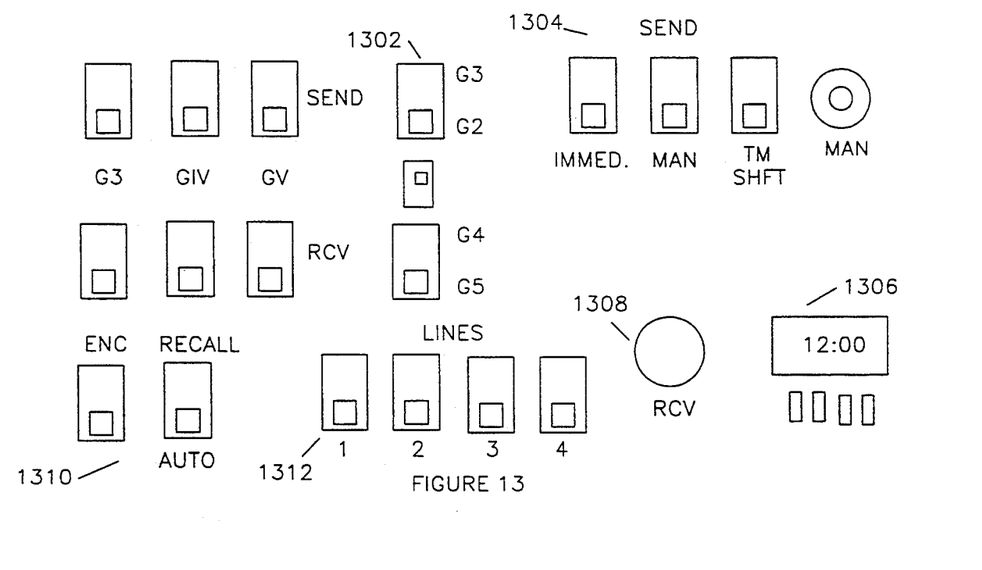
FIG. 13 shows a representative control panel layout.

FIG. 13 shows a controlling panel for the device, reading on configuration circuit 320. A number of controls are provided. Group mode switches 1300 include switches for Group III, Group IV and Group V mode. The sending switches indicate the highest group in which it is desired to send and/or receive. Group configuration switches 1302 are set to indicate the highest group that the local facsimile can accommodate. The settings shown in FIG. 13 indicate send and receive in Group IV and that local fax 202 can only accommodate Group III. The send mode 1304 choose when a received communication which is stored will be sent to the appropriate place. The send immediate switch sends the communications as soon as they are recorded, and as soon as they can be appropriately sent. The send manual mode sends the communications responsive to the manual push button switch. Time-shift mode allows data which is sent to be stored in the memory, and sent at a predetermined time which is also set. A clock with appropriate numbers and settings 1306 is provided. This clock is used to set the time of day, and the time at which time-shift communications should be sent. A receive indicator light 1308 is provided which may light or flash to indicate that a message has been received. This is used in conjunction with the manual switch and manual push button to determine when a manual operation should occur.

The encryption controllers 1310 include the encryption mode on, and the auto recall button, while the number of line switches 1312 enable from one to four incoming lines to be used.

It is necessary that the receive indicator 1308 and the clock information 1306 be placed in an accessible location. However, the remaining controls may be placed under an access hatch or the like, and may be accomplished by dip switches.

Although only a few embodiments have been described in detail above, those of ordinary skill in the art will certainly understand that many modifications are possible in the preferred embodiments without materially departing from the teachings thereof. For instance, any one of these embodiments could be used separately or in conjunction with any others of the embodiments. The storage unit described could be an audio tape, or could be solid state memory storage or any other type of known storage. The converting apparatus has been described as merely exemplary, it being understood that there are many other ways of converting from one group of facsimile machines to another group, in a more elegant manner. Similarly, the technique of selectively interrupting communications between the remote and the local is merely exemplary. Many other equivalent ways would be known by those of ordinary skill in the art to accomplish all of these functions.

All such modifications are intended to be encompassed within the invention as defined by the following claims.

What is claimed is:

1. A message communication device, comprising:
   means for receiving a communication from a remote location;
   means for sensing a condition indicative of both of: a) said communication being encoded and b) a decryption code being unavailable; and
   means for recording said encoded communication only when said condition is sensed, and for passing said communication to a message receiver when said condition is not sensed.

2. A device as in claim 1, wherein said communication is a facsimile communication and further comprising means for exchanging standard facsimile handshaking signals with a facsimile machine sending said facsimile communication.

3. A device as in claim 2, wherein said sensing means is a manually operable switch, and further comprising means for indicating that a communication has been recorded.

4. A device as in claim 3, further comprising means for playing back said communication at a later time, wherein said handshaking means provided standard facsimile handshaking signals to a local facsimile machine to effect said playback.

5. A communication/conversion apparatus for a local facsimile machine, comprising:
   means for connecting with two separate telephone lines;
   means for communicating with a selected facsimile machine, including sending to said selected facsimile machine and receiving from said selected facsimile machine standard format facsimile handshaking signals;
   means for recording an audio signal indicative of a substantive facsimile communication other than said handshaking signals from the selected facsimile machine; and processing means, for:

detecting an incoming call on either of said two telephone lines from a remote facsimile machine, and determining if said local facsimile machine is busy; and commanding said communicating means to send said handshaking signals to said remote facsimile machine when said local machine is busy, and for commanding said recording means to record said audio signals therefrom.

6. An apparatus as in claim 5, wherein said processing means also includes means for sending said incoming call to said local facsimile machine when it is not busy.

7. An apparatus as in claim 5, wherein said recording means includes two, simultaneously accessible audio recording devices.

8. An apparatus as in claim 5, wherein said recording means includes one audio recording device, and means for determining if said audio recording device and said local facsimile machine is busy and sending a busy tone.

9. An apparatus as in claim 5, wherein said processing means is also for determining when said local facsimile machine is no longer busy, and for handshaking with said local facsimile machine and sending said recorded audio signals to said local facsimile machine.

10. A system as in claim 9 further comprising converting means, connected to said recording means and said processing means for converting said recorded audio signals from a first facsimile format to a second facsimile format.

* * * * *